US012367285B1

(12) United States Patent
de Oliveira et al.

(10) Patent No.: US 12,367,285 B1
(45) Date of Patent: Jul. 22, 2025

(54) DETECTING MALICIOUS SHELL SCRIPTS IN COMPUTE INSTANCES OF CLOUD COMPUTING PLATFORMS

(71) Applicant: Trend Micro Incorporated, Tokyo (JP)

(72) Inventors: Alfredo de Oliveira, Toronto (CA); David Fiser, Toronto (CA)

(73) Assignee: Trend Micro Incorporated, Tokyo (JP)

( * ) Notice: Subject to any disclaimer, the term of this patent is extended or adjusted under 35 U.S.C. 154(b) by 137 days.

(21) Appl. No.: 18/354,886

(22) Filed: Jul. 19, 2023

(51) Int. Cl.
*G06F 21/56* (2013.01)
*G06N 20/10* (2019.01)

(52) U.S. Cl.
CPC .......... *G06F 21/566* (2013.01); *G06N 20/10* (2019.01); *G06F 2221/034* (2013.01)

(58) Field of Classification Search
CPC .. G06F 21/566; G06F 2221/034; G06N 20/10
See application file for complete search history.

(56) References Cited

U.S. PATENT DOCUMENTS

| | | | | |
|---|---|---|---|---|
| 10,956,477 | B1 * | 3/2021 | Fang | G06F 40/30 |
| 11,677,786 | B1 * | 6/2023 | Vashisht | H04L 63/1433 |
| | | | | 726/22 |
| 11,954,202 | B2 * | 4/2024 | Marbouti | G06N 3/096 |
| 2016/0253500 | A1 * | 9/2016 | Alme | G06F 16/2246 |
| | | | | 726/23 |
| 2017/0289191 | A1 * | 10/2017 | Thioux | H04L 63/1441 |
| 2021/0165881 | A1 * | 6/2021 | Saxe | G06N 3/04 |
| 2023/0259624 | A1 * | 8/2023 | Hassanain | G06N 5/022 |
| | | | | 726/23 |
| 2025/0045395 | A1 * | 2/2025 | Cosentino | G06F 21/566 |

FOREIGN PATENT DOCUMENTS

| | | | | |
|---|---|---|---|---|
| CN | 111723372 | A * | 9/2020 | G06F 21/563 |
| CN | 108322428 | B * | 11/2021 | H04L 63/1425 |
| CN | 114780957 | A * | 7/2022 | G06F 21/562 |
| EP | 3208718 | A1 * | 8/2017 | G06F 21/53 |

OTHER PUBLICATIONS

"10 most popular Linux distributions, and why they exist", Packagecloud, Sep. 14, 2021.
"API Reference", Scikit Learn, downloaded Jul. 7, 2023.
A Man Kumar, "C and Gamma in SVM", Medium, Dec. 17, 2018.
David Fiser & Alfredo Oliveira, "Groups Target Alibaba ECS Instances for Cryptojacking", Trend Micro, Nov. 15, 2021.

(Continued)

*Primary Examiner* — Christopher A Revak
(74) *Attorney, Agent, or Firm* — Beyer Law Group LLP (57) ABSTRACT

A cloud computing platform provides compute instances of customer accounts. A shell script in a compute instance is evaluated by normalizing the shell script to output a set of tokens that are separated by a predetermined separator. The set of tokens is searched for presence of reference tokens. The counts of the reference tokens in the set of tokens are formed into an occurrence vector, which is evaluated by a machine learning model to determine if the shell script is malicious.

10 Claims, 7 Drawing Sheets

(56) References Cited

OTHER PUBLICATIONS

Alfredo Oliveira, "Malicious Shell Script Steals Cloud Credentials", Trend Micro, Jan. 8, 2021.
"Scikit-learn", Wikipedia, downloaded Jul. 10, 2023.
"Shell (computing)", Wikipedia, downloaded Jul. 7, 2023.
"Shell script", Wikipedia, downloaded Jul. 7, 2023.
"Shell Scripting Tutorial", Tutorialspoint, downloaded Jun. 20, 2023, https://www.tutorialspoint.com/unix/shell_scripting.htm.
"Support vector machine", Wikipedia, downloaded Jun. 20, 2023.
Alfredo Oliveira, "TeamTNT Continues Attack on the Cloud, Targets AWS Credentials", Trend Micro, Mar. 9, 2021.
David Fiser, "TeamTNT Now Deploying DDoS-Capable IRC Bot TNTbotinger", Dec. 18, 2020.
David Fiser & Alfredo Oliveira, "TeamTNT Upgrades Arsenal, Refines Focus on Kubernetes and GPU Environments", Trend Micro, Nov. 11, 2021.
David Fiser & Alfredo Oliveira, "Team TNT's Extended Credential Harvester Targets Cloud Services, Other Software", Trend Micro, May 18, 2021.
Alfredo Oliveira & David Fiser, "Threat Actors Now Target Docker via Container Escape Features", Trend Micro, Feb. 9, 2021.
"VirusTotal", Wikipedia, downloaded Jul. 7, 2023.
Alfredo Oliveira & David Fiser, "War of Linux Cryptocurrency Miners: A Battle for Resources", Trend Micro, Sep. 10, 2020.

\* cited by examiner

```
ps aux | grep ioc1 | pkill -9 ...
ps aux | grep ioc2 | pkill -9 ...
...
ps aux | grep iocn | pkill -9 ...

if [cloud condition]
  ...
fi apt-get install -y curl wget bash make gcc 2>/dev/null 1>/dev/null for user in $userlists; do
 for host in $hostlist; do
  for key in $keylist; do

...

ARR = (".ssh/authorized_keys",
    ".aws/credentials",
    ".config/gcloud.credentials.db")
```

```
ps
aux
|
grep
ioc1
ioc2
pkill
-9
if
[
]
fi
apt-get
install
-y
curl
wget
bash
make
gcc
for
cloudId1
cloudId2
...
cloudId_n
.ssh/authorized_keys
.config/gcloud.credentials.db
```

```
pkill
-9
curl
cloudId_1
cloudId_2
for
ps
if
apt-get
.ssh/authorized_keys
```

FIG. 6

[ count(pkill), count(-9), count(curl), count(cloudId1), count(cloudId2), count(for), count(ps), count(if), count(apt-get), count(.ssh/authroized_keys)]

DETECTING MALICIOUS SHELL SCRIPTS IN COMPUTE INSTANCES OF CLOUD COMPUTING PLATFORMS

TECHNICAL FIELD

The present disclosure is generally directed to cybersecurity, and more particularly to detecting malicious shell scripts in compute instances of cloud computing platforms.

BACKGROUND

A cloud computing platform comprises hardware and software infrastructure for providing on-demand computing environments, referred to as compute instances. There are many cloud service providers, such as the Amazon Web Services (AWS™), that offer cloud computing platform as-a-service (AAS) to third-party customers on the Internet. A compute instance runs an operating system and one or more application programs of a customer account on the cloud computing platform. Currently, the vast majority of compute instances run the LINUX operating system.

A shell script is a computer program that is designed to be run by a UNIX shell, which is a command-line interpreter that exposes operating system services to a human user or other programs. The LINUX operating system, being a UNIX-like operating system, includes a shell interpreter capable of executing shell scripts.

Malicious shell scripts are a prevalent security threat to LINUX and other UNIX-like based systems, often used by threat actors (i.e., cybercriminals, hackers) to deploy cryptojacking payloads that exploit unsecured resources on the Internet, including compute instances of cloud computing platforms. Traditional signature-based detection methods struggle to effectively identify new variants of these malicious shell scripts. Oftentimes, a signature developed to detect a particular malicious shell script will not accurately detect variants of the particular malicious shell script. This makes it very difficult to create and maintain signatures for detecting malicious shell scripts that attack compute instances of cloud computing platforms.

BRIEF SUMMARY

In one embodiment, a method of detecting malicious shell scripts includes receiving a target shell script in a compute instance of a cloud computing platform, the compute instance running a distribution of a LINUX operating system. The target shell script is normalized into a set of tokens that are separated by a predetermined separator. The set of tokens is searched for presence of reference tokens. A number of times each of the reference tokens appears in the set of tokens is counted. An occurrence vector of the target shell script is generated, with the occurrence vector indicating a count of each of the reference tokens in the set of tokens. The occurrence vector is evaluated using a machine learning model to determine if the target shell script is a malicious shell script.

In another embodiment, a system for detecting malicious shell scripts includes a cloud computing platform and a backend system. The cloud computing platform comprises at least one processor to: provide a plurality of compute instances of customer accounts on the cloud computing platform; receive a target shell script in a compute instance of the plurality of compute instances; normalize the target shell script to separate text of the target shell script into a set of tokens that are separated by a predetermined separator; count a number of times each of a plurality of reference tokens appears in the set of tokens; generate an occurrence vector that indicates a count of each of the plurality of reference tokens in the set of tokens; and use a Support Vector Machine (SVM) model in the compute instance to evaluate the occurrence vector to determine if the target shell script is a malicious shell script. The SVM model is trained on the backend system and provided from the backend system to the compute instance over the Internet.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
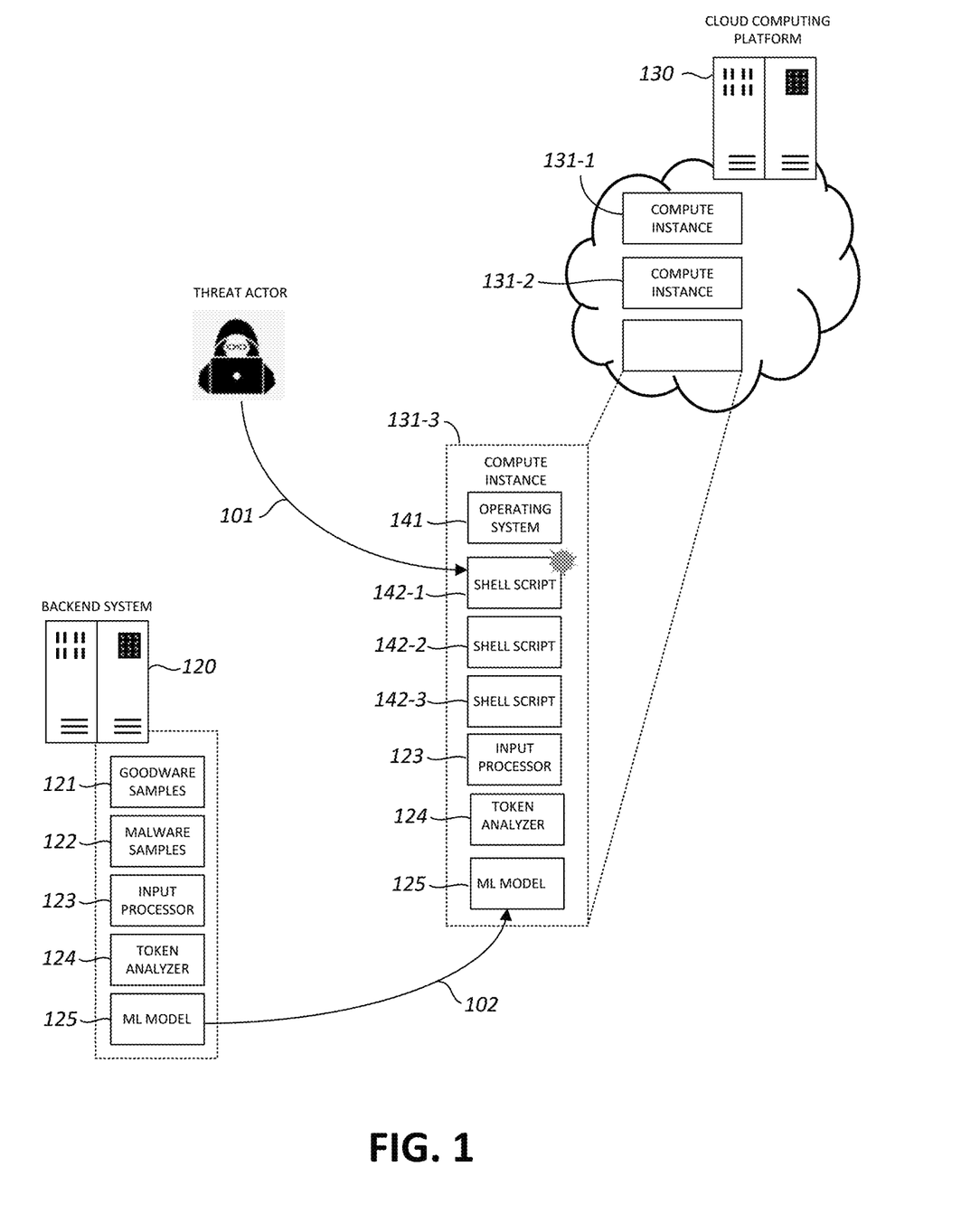
FIG. 1 shows a block diagram of a system for detecting malicious shell scripts in compute instances of cloud computing platforms, in accordance with an embodiment of the present invention.

FIG. 1 shows a block diagram of a system for detecting malicious shell scripts in compute instances of cloud computing platforms, in accordance with an embodiment of the present invention. The system of FIG. 1 includes a backend system 120 and a cloud computing platform 130.

The cloud computing platform 130 may be that of the Amazon Web Services (AWS™) or other cloud service provider on the public Internet. The cloud computing platform 130 is provided as-a-service (AAS) to third-party customers who maintain an account with the cloud service provider. A customer account can launch one or more compute instances 131 (i.e., 131-1, 131-2, 131-3, ... ) on the cloud computing platform 130. In one embodiment, a compute instance 131 is a virtual machine instance. A compute instance 131 (e.g., see 131-3) may include an operating system 141, one or more shell scripts 142 (i.e., 142-1, 142-2, 142-3, ... ), and other computer programs.

In one embodiment, the operating system 141 is a distribution of the LINUX operating system. For example, the operating system 141 may be the Ubuntu LINUX distribution. As can be appreciated, embodiments of the present invention are equally applicable to other LINUX distributions.

A shell script 142 is a script that is designed to be executed by a shell of the operating system 141. For example, a shell script 142 may be executable by the Bash (Bourne-Again Shell) shell. Unlike a binary file, a shell script 142 is in human-readable form and is executed by a command-line interpreter.

Embodiments of the present invention are especially effective in detecting malicious shell scripts that are designed to attack compute instances of cloud computing platforms. The rapid adoption of cloud computing platforms has incentivized threat actors to develop LINUX-based malicious artifacts, such as malware, exploits, grayware tools, etc. Unlike in other operating systems, users of the LINUX operating system have a greater variety of running environments to choose from (e.g., CPU architecture, Kernel version, libraries, LINUX operating system distribution), making it more difficult and not as effective for threat actors to use compiled binaries in large scale attacks. Shell scripts are a good attack vehicle for threat actors because a shell script can run in most UNIX-like operating systems, which are widely-supported in compute instances. In the example of FIG. 1, the shell script 142-1 is a malicious shell script. The shell script 142-1, which is from a threat actor (see arrow 101), may have entered the compute instance 131-3 in one of many ways commonly-employed by threat actors to deploy malware.

As will be more apparent below, a cybersecurity module comprising an input processor, a token analyzer, and a machine learning model may be deployed in a compute instance to detect malicious shell scripts. In the example of FIG. 1, an input processor 123, token analyzer 124, and machine learning model 125 execute in the compute instance 131-3 to detect the malicious shell script 142-1.

The machine learning model 125 may be created and trained on the backend system 120. The backend system 120 may comprise one or more server computers, a cloud computing platform, or other computer system. The backend system 120 may include a data storage device for storing a plurality of goodware samples 121 and a plurality of malware samples 122. The backend system 120 includes a memory that stores instructions of software components, such as the input processor 123, token analyzer 124, and machine learning model 125, that when executed by at least one processor of the backend system 120 cause the backend system 120 to perform operations described herein.

The goodware samples 121 and malware samples 122 are collected on the backend system 120. Each of the goodware samples 121 is a known non-malicious (i.e., known good/safe) shell script. The goodware samples 121 may be obtained from the VirusTotal website, from Ubuntu LINUX distribution native scripts, and other sources. Each of the malware samples 122 is a known malicious shell script. The malware samples 122 may be obtained from cybersecurity researchers, software vendors, cybersecurity organizations, and other sources.

The input processor 123 and the token analyzer 124 perform the same function of generating occurrence vectors of shell scripts on the backend system 120 and in a compute instance 131. The occurrence vectors are used on the backend system 120 as training dataset for training the machine learning model 125, whereas the occurrence vectors are evaluated in a compute instance 131 using the machine learning model 125 to determine if the corresponding shell scripts are malicious.

The input processor 123 is configured to parse and normalize a shell script. The input processor 123 may normalize a shell script by converting text of the shell script into lowercase and splitting the text into individual tokens. Each token is a continuous string of one or more printable characters. The tokens are separated by a predetermined separator, which in one embodiment is the space character (i.e., ASCII 0x20). For shell scripts that include binary data (as opposed to text), the input processor 123 may encode the binary data into printable ASCII characters when possible and discard non-printable characters.

The token analyzer 124 is configured to identify reference tokens in a set of tokens of a shell script, count the occurrence of each identified reference token in the shell script, and output an occurrence vector of the shell script. The reference tokens comprise predefined tokens that are commonly found in malicious shell scripts that attack compute instances and predefined tokens that are commonly found in non-malicious shell scripts of compute instances. Each element of the occurrence vector indicates how many times a corresponding reference token appears in the shell script. An occurrence vector may be used as a feature vector for training the machine learning model 125 during the training phase and as an input to the machine learning model 125 during the inference phase. As is well understood, the training phase is when a machine learning model is trained, whereas the inference phase is when the machine learning model is employed to generate an inference. In one embodiment, the machine learning model 125 is trained to determine if a target (i.e., being evaluated) shell script is malicious or non-malicious based on the occurrence vector of the target shell script.

On the backend system 120, the input processor 123 normalizes the goodware samples 121 and malware samples 122 to generate a set of tokens of each of the samples. The token analyzer 124 processes the sets of tokens to generate corresponding occurrence vectors. An occurrence vector of a goodware example 121 is labeled as "non-malicious," whereas an occurrence vector of a malware sample 122 is labeled as "malicious". The labeled occurrence vectors are used as training dataset for supervised learning of the machine learning model 125. In one embodiment, the machine learning model 125 is a Support Vector Machine (SVM) model with a polynomial kernel and having gamma (i.e., kernel coefficient) set to auto. The machine learning model 125 may be created and trained using a suitable conventional SVM algorithm, such as the "sklearn.svm" module from the scikit-learn machine learning library.

Once trained on the backend system 120, the machine learning model 125 may be provided to the cloud computing platform 130 over the Internet for installation in one or more compute instances 131.

In the example of FIG. 1, the machine learning model 125 is installed in the compute instance 131-3 (see arrow 102). The input processor 123 in the compute instance 131-3 normalizes a target shell script 142 to output a set of tokens of the target shell script 142. The token analyzer 124 in the compute instance 131-3 processes the set of tokens of the target shell script 142 to generate an occurrence vector of the target shell script 142. The machine learning model 125 in the compute instance 131-3 evaluates the occurrence vector of the target shell script 142 to determine whether the target shell script 142 is a malicious or non-malicious shell script.

By going through the same process for each shell script 142 in the compute instance 131-3, the shell script 142-1 may be detected to be malicious.

Figure 2:
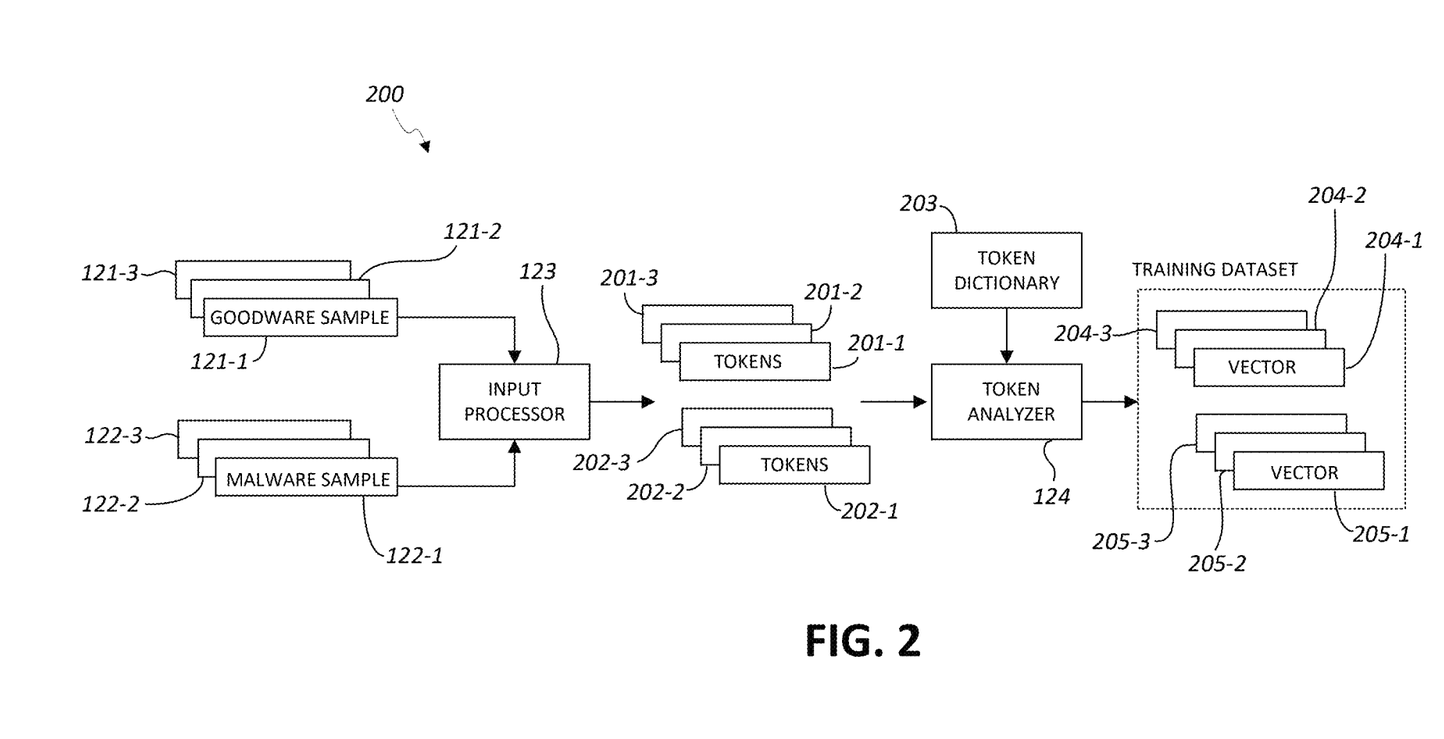
FIG. 2 shows a flow diagram of a method of generating occurrence vectors for training a machine learning model to detect malicious shell scripts in compute instances of cloud computing platforms, in accordance with an embodiment of the present invention.

FIG. 2 shows a flow diagram of a method 200 of creating occurrence vectors for training a machine learning model to detect malicious shell scripts in compute instances of cloud computing platforms, in accordance with an embodiment of the present invention. The method 200 may be performed during the training phase of the machine learning model 125 on the backend system 120.

In the example of FIG. 2, the goodware samples 121 (i.e., 121-1, 121-2, 121-3, ...) and malware samples 122 (i.e., 122-1, 122-2, 122-3, ...) are provided as input to the input processor 123. For each of the samples 121, 122, the input processor 123 normalizes the sample by converting text of the sample into lowercase and splitting the text into individual tokens that are separated by the space character (i.e., ASCII 0x20). For samples that have binary data, the input processor 123 encodes the binary data into printable ASCII characters when possible and discards non-printable characters. The normalized sample is output as a set of tokens of the sample. More particularly, the input processor 123 normalizes the goodware sample 121-1 to output the tokens 201-1, normalizes the goodware sample 121-2 to output the tokens 201-2, normalizes the goodware sample 121-3 to output the tokens 201-3, etc. Similarly, the input processor 123 normalizes the malware sample 122-1 to output the tokens 202-1, normalizes the malware sample 122-2 to output the tokens 202-2, normalizes the malware sample 122-3 to output the tokens 202-3, etc.

A token dictionary 203 comprises a listing of a fixed number of reference tokens to be identified by the token analyzer 124 in shell scripts. The reference tokens are selected to be particularly relevant to shell scripts of compute instances in that they comprise tokens that are commonly found in malicious shell scripts that attack compute instances, and tokens that are commonly found in non-malicious shell scripts of compute instances. In selecting the reference tokens, tokens that are commonly found in non-malicious shell scripts may be given preference to improve the ability of the machine learning model 125 to distinguish non-malicious shell scripts from malicious shell scripts. The reference tokens are selected to be particularly relevant to shell scripts of compute instances for improved detection of malicious shell scripts and to minimize false positives. Selecting reference tokens that are particularly relevant to shell scripts also allows for a relatively low (e.g., less than 1000) and fixed number of reference tokens, thereby improving processing performance.

The token analyzer 124 searches a set of tokens of a sample shell script for presence of reference tokens listed in the token dictionary 203 and generates an occurrence vector that indicates a count of each of the reference tokens found in the set of tokens. As a particular example, given reference tokens A, B, C, and D in the token dictionary 203; token A appears 3 times in a set of tokens of a sample shell script; token B is not found in the set of tokens (i.e., appears zero times); token C is not found in the set of tokens; and token D appears 6 times in the set of tokens, an occurrence vector [token A, token B, token C, token D] of the sample shell script may be [3, 0, 0, 6].

In the example of FIG. 2, the token analyzer 124 searches the tokens 201-1 of the goodware sample 121-1 for presence of the reference tokens and generates an occurrence vector 204-1 that indicates a count of each of the reference tokens found in the tokens 201-1. Similarly, the token analyzer 124 searches the tokens 202-1 of the malware sample 122-1 for presence of the reference tokens and generates an occurrence vector 205-1 that indicates a count of each of the reference tokens found in the tokens 202-1. The token analyzer 124 processes the tokens 201-2, 201-3, 202-2, 202-3, etc. in the same manner to generate respective occurrence vectors 204-2, 204-3, 205-2, 205-3, etc. The occurrence vectors 204, 205 are used as training dataset for supervised learning of the machine learning model 125 using a suitable SVM algorithm.

Figure 3:
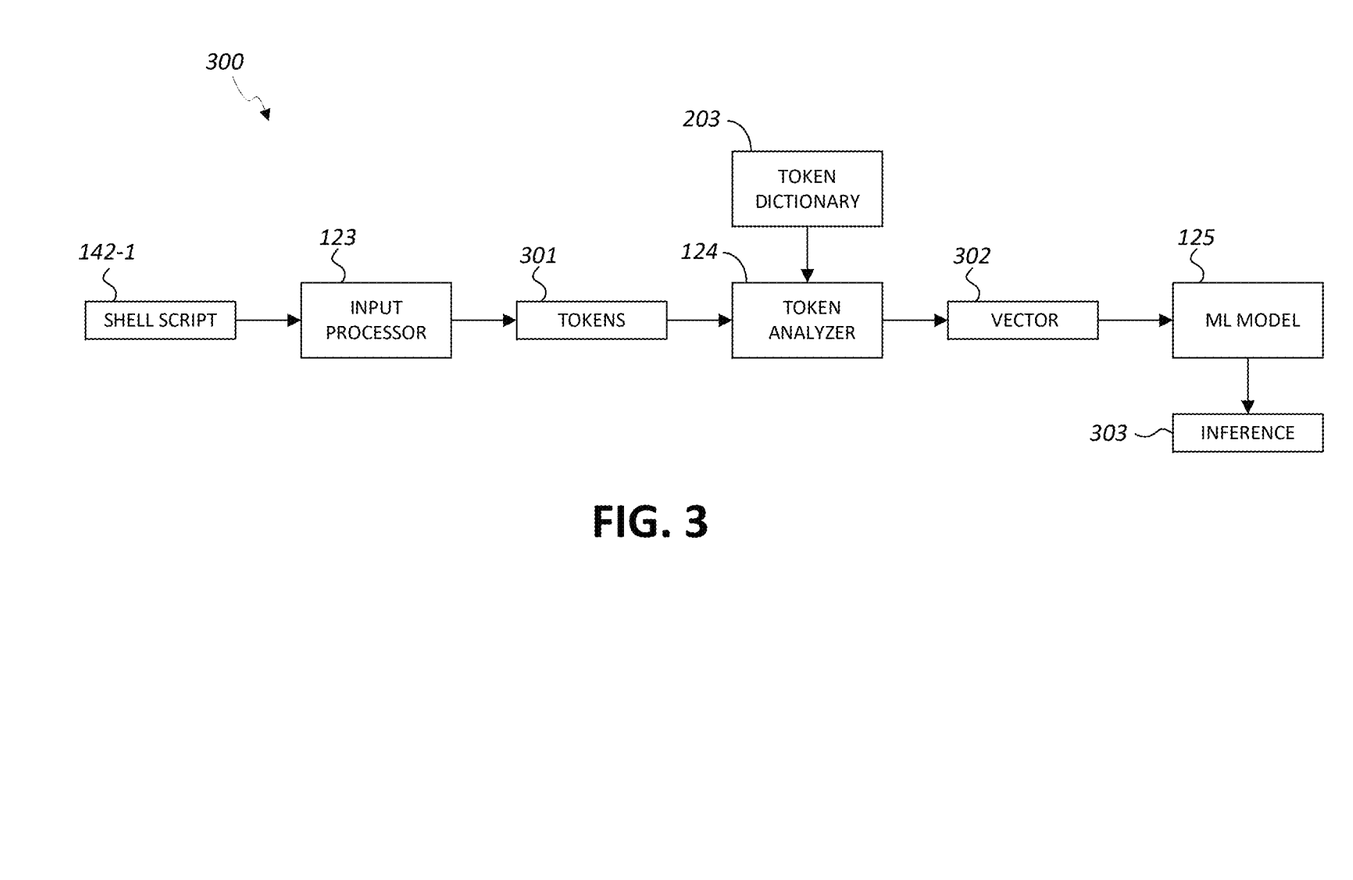
FIG. 3 shows a flow diagram of a method of detecting malicious shell scripts in compute instances of cloud computing platforms, in accordance with an embodiment of the present invention.

FIG. 3 shows a flow diagram of a method 300 of detecting malicious shell scripts in compute instances of cloud computing platforms, in accordance with an embodiment of the present invention. The method 300 may be performed in a compute instance 131 on the cloud computing platform 130 during the inference phase of the machine learning model 125.

In the example of FIG. 3, the target shell script 142-1 is normalized by the input processor 123 to output a set of tokens 301 of the target shell script 142-1. The token analyzer 124 searches the tokens 301 for presence of reference tokens listed in the token dictionary 203, and generates an occurrence vector 302 that provides a count of each of the reference tokens found in the tokens 301. The occurrence vector 302 is input to the machine learning model 125, which generates an inference 303 that indicates whether or not the target shell script 142-1 is malicious.

One or more corrective actions may be performed in response to detecting a malicious shell script. Such corrective actions may be initiated by a component of a cybersecurity module in the compute instance, and may include raising an alert (e.g., showing a warning message on a display screen, recording a detection log entry, sending a message to cybersecurity personnel), blocking operations of the malicious shell script, terminating the malicious shell script, etc.

The method 300 is now further explained with reference to FIGS. 4-7.

Figure 4:
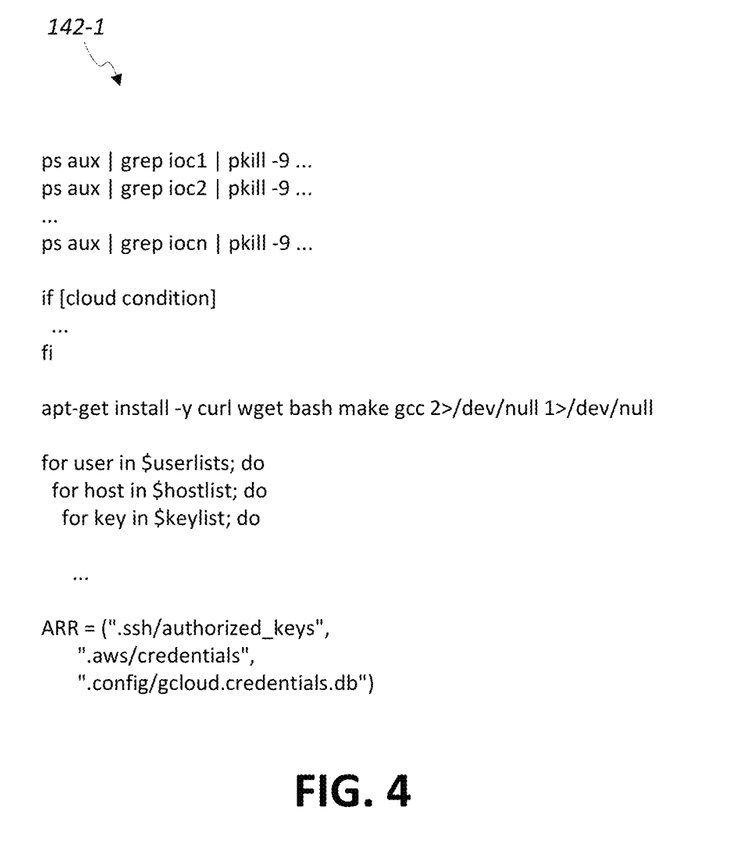
FIGS. 4-7 illustrate an example processing of a shell script to generate an occurrence vector of the shell script.
Figure 5:
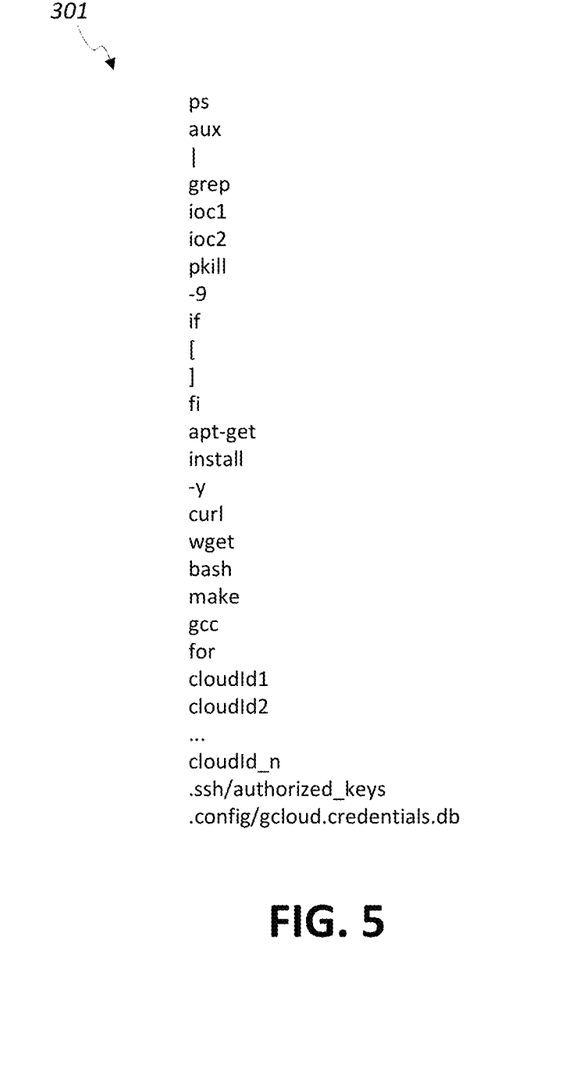
Figure 6:
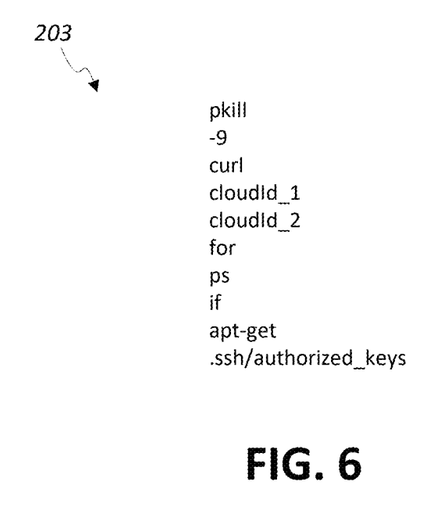
Figure 7:
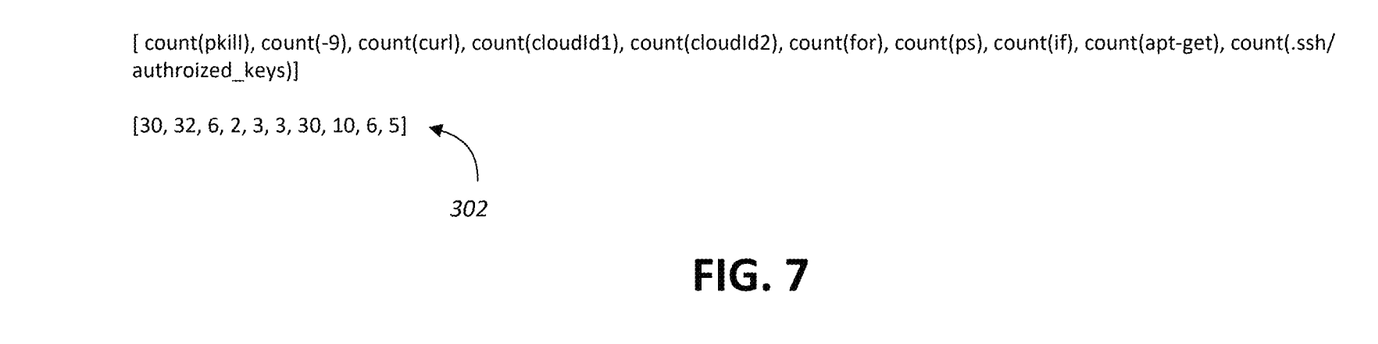

FIG. 4 shows a portion of the target shell script 142-1. Only a portion of the shell script 142-1 is shown in FIG. 4 for clarity of illustration. FIG. 5 shows the tokens 301, which is output by the input processor 123 by normalizing the shell script 142-1. In FIG. 5, each of the tokens is shown on a separate line (as opposed to being separated by the space character or other separator) for clarity of illustration. FIG. 6 shows the reference tokens listed in the token dictionary 203. Only 10 reference tokens are shown in FIG. 6 for clarity of illustration. Accordingly, the occurrence vector 302 of the shell script 142-1 has 10 elements in this example. FIG. 7 shows the occurrence vector 302, which shows a count of 30 for the token "pkill", a count of 32 for the token "−9", a count of 6 for the token "curl", a count of 2 for the token "cloudId_1", etc. The machine learning model 125 evaluates the occurrence vector 302 to generate the inference 303, which in this example indicates that the shell script 142-1 is malicious.

As noted, the input processor 123 and token analyzer 124 operate in a similar manner in both the training phase and inference phase of the machine learning model 125, except that the resulting occurrence vector is used as part of the training dataset in the training phase and is evaluated by the machine learning model in the inference phase. FIGS. 4-7 illustrate an example processing of a target shell script to generate an occurrence vector of the target shell script in the inference phase. The example of FIGS. 4-7 is equally applicable to generating an occurrence vector of a sample shell script in the training phase.

Figure 8:
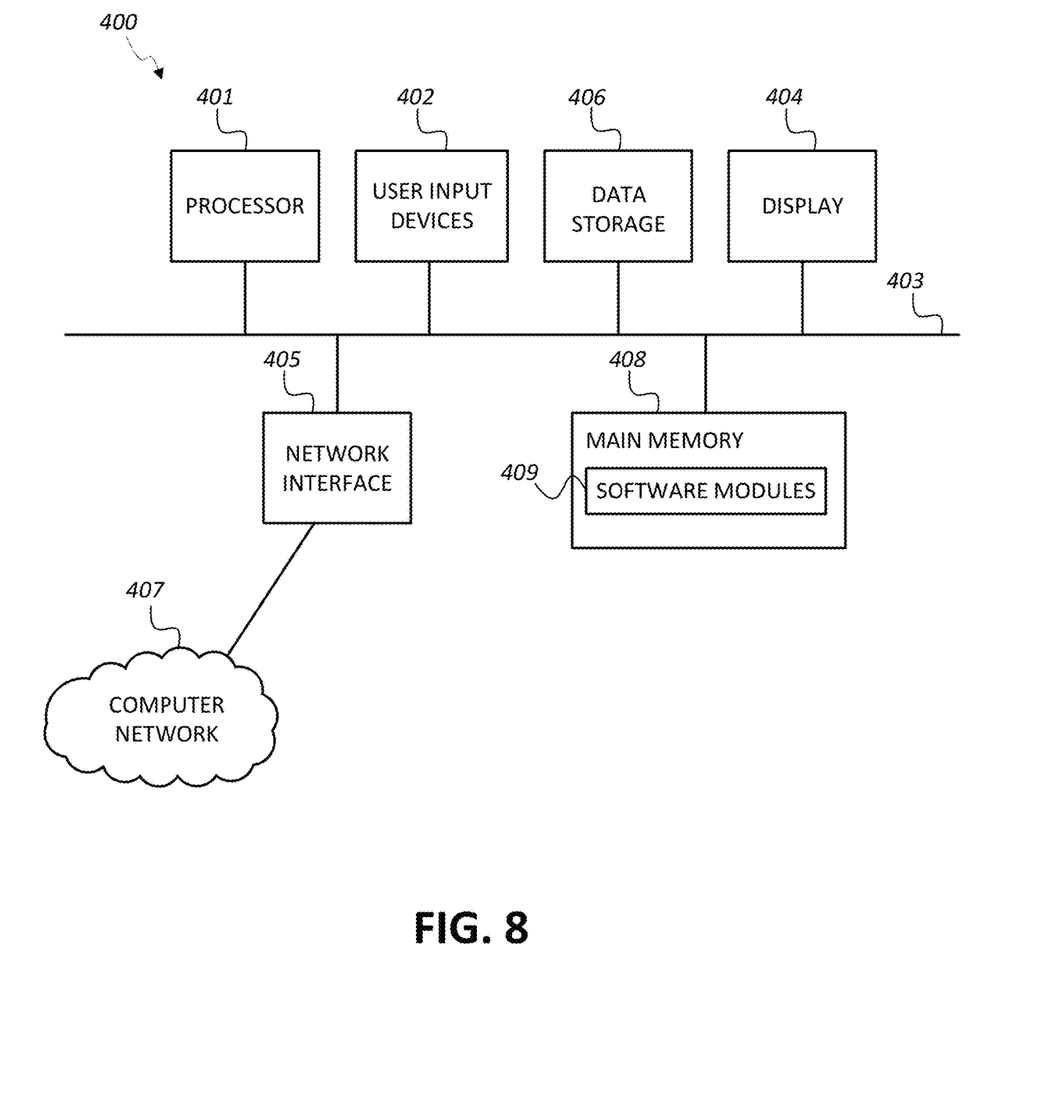
FIG. 8 shows a block diagram of a computer system that may be employed with embodiments of the present invention

FIG. 8 shows a block diagram of a computer system 400 that may be employed with embodiments of the present invention. The computer system 400 may be employed as a computer system of a backend, cloud computing platform, etc. The computer system 400 may have fewer or more components to meet the needs of a particular cybersecurity application. The computer system 400 may include one or more processors 401. The computer system 400 may have one or more buses 403 coupling its various components. The computer system 400 may include one or more user input devices 402 (e.g., keyboard, mouse), one or more data storage devices 406 (e.g., hard drive, optical disk, solid state drive), a display screen 404 (e.g., liquid crystal display, flat panel monitor), a computer network interface 405 (e.g., network adapter, modem), and a main memory 408 (e.g., random access memory). The computer network interface 405 may be coupled to a computer network 407, which in this example includes the Internet.

The computer system 400 is a particular machine as programmed with one or more software modules 409, comprising instructions stored non-transitory in the main memory 408 for execution by at least one processor 401 to cause the computer system 400 to perform corresponding programmed steps. An article of manufacture may be embodied as computer-readable storage medium including instructions that when executed by at least one processor 401 cause the computer system 400 to be operable to perform the functions of the one or more software modules 409. The software modules 409 may include shell scripts, an input processor, a token analyzer, a machine learning model, etc.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting malicious shell scripts, the method comprising:
   receiving a target shell script in a compute instance of a plurality of compute instances of a cloud computing platform, the compute instance running a distribution of a LINUX operating system;
   normalizing the target shell script into a set of tokens, the set of tokens comprising tokens of the target shell script that are separated by a predetermined separator;
   searching the set of tokens for presence of reference tokens, the reference tokens comprising predefined tokens that are found in malicious shell scripts that attack compute instances and predefined tokens that are found in non-malicious shell scripts of compute instances;
   counting a number of times each of the reference tokens appear in the set of tokens;
   generating an occurrence vector of the target shell script, the occurrence vector indicating a count of each of the reference tokens found in the set of tokens; and
   evaluating the occurrence vector in the compute instance using a machine learning model to determine if the target shell script is a malicious shell script.

2. The method of claim 1, wherein normalizing the target shell script includes converting text of the target shell script into lowercase and separating the text using the predetermined separator.

3. The method of claim 2, wherein the predetermined separator is a space character.

4. The method of claim 1, wherein the machine learning model is a Support Vector Machine.

5. The method of claim 1, further comprising:
   normalizing goodware samples into respective sets of goodware tokens, each of the goodware samples is a known non-malicious shell script;
   for each of the sets of goodware tokens, counting a number of times each of the reference tokens appear in the set of goodware tokens to generate a goodware occurrence vector;
   normalizing malware samples into respective sets of malware tokens, each of the malware samples is a known malicious shell script;
   for each of the sets of malware tokens, counting a number of times each of the reference tokens appears in the set of malware tokens to generate a malware occurrence vector; and
   training the machine learning model to detect malicious and non-malicious shell scripts using a training dataset that comprises goodware occurrence vectors of the goodware samples and malware occurrence vectors of the malware samples.

6. The method of claim 5, further comprising:
   after training the machine learning model, providing the machine learning model to the compute instance over the Internet.

7. A system for detecting malicious shell scripts, the system comprising:
   a cloud computing platform comprising at least one processor to:
      provide a plurality of compute instances to customer accounts on the cloud computing platform;
      receive a target shell script in a compute instance of the plurality of compute instances;
      normalize the target shell script to separate text of the target shell script into a set of tokens that are separated by a predetermined separator;
      count a number of times each of a plurality of reference tokens appears in the set of tokens, the plurality of reference tokens comprising predefined tokens that are found in malicious shell scripts that attack compute instances and predefined tokens that are found in non-malicious shell scripts of compute instances;
      generate an occurrence vector that indicates a count of each of the plurality of reference tokens found in the set of tokens; and
      use a Support Vector Machine (SVM) model to evaluate the occurrence vector in the compute instance to determine whether the target shell script is a malicious shell script or a non-malicious shell script; and
   a backend system where the SVM model is trained, wherein the SVM model is provided from the backend system to the compute instance over the Internet.

8. The system of claim 7, wherein the target shell script is normalized by converting text of the target shell script into lowercase characters.

9. The system of claim 8, wherein the predetermined separator is a space character.

10. The system of claim 7, wherein the backend system comprises at least one processor to:
   normalize goodware samples into respective sets of goodware tokens, each of the goodware samples is a known non-malicious shell script;
   for each of the sets of goodware tokens, count a number of times each of the reference tokens appears in the set of goodware tokens to generate a goodware occurrence vector;

normalize malware samples into respective sets of malware tokens, each of the malware samples is a known malicious shell script;

for each of the sets of malware tokens, count a number of times each of the reference tokens appears in the set of malware tokens to generate a malware occurrence vector; and train the SVM model using a training dataset that comprises goodware occurrence vectors of the goodware samples and malware occurrence vectors of the malware samples.

\* \* \* \* \*